(12) United States Patent
Detlefsen et al.

(10) Patent No.: US 8,721,432 B2
(45) Date of Patent: May 13, 2014

(54) MANAGING MARKETING OFFERS IN WAGERING GAME NETWORKS

(75) Inventors: David E. Detlefsen, Northfield, IL (US); Shridhar P. Joshi, Naperville, IL (US); Mark C. Pace, Palatine, IL (US)

(73) Assignee: WMS Gaming, Inc., Waukegan, IL (US)

( * ) Notice: Subject to any disclaimer, the term of this patent is extended or adjusted under 35 U.S.C. 154(b) by 353 days.

(21) Appl. No.: 12/790,406

(22) Filed: May 28, 2010

(65) Prior Publication Data
US 2010/0304848 A1 Dec. 2, 2010

Related U.S. Application Data

(60) Provisional application No. 61/182,513, filed on May 29, 2009.

(51) Int. Cl.
*G06F 17/00* (2006.01)
*G06Q 30/02* (2012.01)
*G07F 17/32* (2006.01)

(52) U.S. Cl.
CPC ............ *G06Q 30/02* (2013.01); *G06Q 30/0247* (2013.01); *G07F 17/32* (2013.01); *G07F 17/3227* (2013.01)
USPC ............................................. 463/25; 463/43

(58) Field of Classification Search
CPC .......................... G06Q 30/0247; G06Q 30/02
USPC .......................... 463/25, 43; 705/14.46, 14.25
See application file for complete search history.

(56) References Cited

U.S. PATENT DOCUMENTS

| | | | | |
|---|---|---|---|---|
| 7,467,106 | B1 * | 12/2008 | Levine et al. | 705/35 |
| 7,674,180 | B2 | 3/2010 | Graham et al. | |
| 7,689,453 | B2 * | 3/2010 | Ramsey et al. | 705/7.31 |
| 7,778,871 | B2 * | 8/2010 | Ramsey et al. | 705/14.46 |
| 8,167,710 | B2 * | 5/2012 | Agarwal et al. | 463/25 |
| 8,244,571 | B2 * | 8/2012 | Cavander et al. | 705/7.29 |
| 2003/0003988 | A1 * | 1/2003 | Walker et al. | 463/21 |
| 2008/0017106 | A1 | 1/2008 | Lipson et al. | |
| 2008/0076532 | A1 | 3/2008 | Graham et al. | |
| 2008/0076534 | A1 | 3/2008 | Iddings et al. | |
| 2008/0076542 | A1 | 3/2008 | Iddings et al. | |
| 2008/0076576 | A1 | 3/2008 | Graham et al. | |
| 2008/0085771 | A1 | 4/2008 | Iddings et al. | |
| 2008/0085772 | A1 | 4/2008 | Iddings et al. | |
| 2008/0200251 | A1 | 8/2008 | Alderucci et al. | |

(Continued)

OTHER PUBLICATIONS

U.S. Appl. No. 61/111,496, filed Nov. 5, 2008.*

(Continued)

*Primary Examiner* — Michael Cuff
(74) *Attorney, Agent, or Firm* — DeLizio Gilliam, PLLC

(57) ABSTRACT

Some embodiments include a computer-implemented method for monitoring and making marketing offers using electronic devices in a wagering game network. The method can include detecting an event in the wagering game network, wherein the event indicates a player's eligibility for a marketing offer, wherein the event originates from one of the electronic devices. The method can also include determining a monetary value of the marketing offer based on terms associated with the marketing offer, and determining, based on the monetary value, that the player's acceptance of the marketing offer would exceed a marketing budget. The method can include reducing the monetary value of the marketing offer to be within the marketing budget, and causing presentation of the marketing offer on the one of the electronic devices.

20 Claims, 9 Drawing Sheets

(56) References Cited

U.S. PATENT DOCUMENTS

| | | |
|---|---|---|
| 2008/0234040 A1 | 9/2008 | Davies |
| 2008/0274792 A1 | 11/2008 | Walker et al. |
| 2009/0070081 A1* | 3/2009 | Saenz et al. ................ 703/2 |
| 2009/0098933 A1 | 4/2009 | Walker et al. |
| 2010/0227683 A1* | 9/2010 | Walker et al. ............... 463/29 |
| 2011/0300926 A1* | 12/2011 | Englman et al. ............. 463/25 |

OTHER PUBLICATIONS

U.S. Appl. No. 61/110,514, filed Oct. 31, 2008.*

* cited by examiner

MANAGING MARKETING OFFERS IN WAGERING GAME NETWORKS

RELATED APPLICATIONS

This application claims the priority benefit of U.S. Provisional Application Ser. No. 61/182,513 filed May 29, 2009.

LIMITED COPYRIGHT WAIVER

A portion of the disclosure of this patent document contains material, which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2009, WMS Gaming, Inc.

FIELD

Embodiments of the inventive subject matter relate generally to wagering game systems, and more particularly to wagering game systems managing distribution of marketing offers based on a loss limit.

BACKGROUND

Today, casinos are more than just places for playing wagering games. In addition to providing live and computerized wagering games, casinos also manage restaurants, hotels, variety entertainment, shopping centers, etc. To entice new customers and ensure loyalty of existing customers, casinos need to constantly offer the most entertaining and exciting wagering game machines, features, enhancements, and experiences. Marketing offers attract new players and customers and secure customer loyalty, while promoting the casino's services.

Traditionally, casinos have modeled and distributed marketing offers based, in part, on redemption statistics of previous marketing offers, analysis of historical marketing offer redemption data, trends based on the historical marketing offer redemption data, and assumptions about the trends and analyses. For example, historical marketing offer redemption analysis may entail determining how many marketing offers were distributed, how many of the previous marketing offers were redeemed, total monetary value of the redeemed marketing offers, what percentage of marketing offer budget was utilized, etc.

Depending on the distribution mode (e.g., print-based marketing offers, email-based marketing offers, etc.), the time between the distribution of the marketing offer and the analysis of redeemed marketing offers can vary from days to weeks, or even months.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes an example wagering game machine network architecture. The third section describes example operations performed by some embodiments and the fourth section describes example wagering game machines and wagering game machine architectures in more detail. The fifth section presents some general comments.

INTRODUCTION

This section provides an introduction to some embodiments of the invention.

Marketing offers can help attract frequent play, introduce players to new wagering games and other casino-based services (e.g., restaurants, hotels, shopping centers, etc.), and promote casino activities that are less popular with the players. Marketing offers are typically subject to monetary restrictions and often have budgets associated with them. Marketing budgets may be overrun if customers redeem offers at higher-than-expected rates.

Some embodiments of the invention facilitate dynamic tracking and monitoring of marketing offers to ensure that the total monetary value of the redeemed marketing offers does not exceed the marketing offer budget. Embodiments of the inventive subject matter describe techniques for presenting, on wagering game machines, marketing offers based on players satisfying requirements for receiving the marketing offers. A marketing server can monitor availability of a marketing offer budget to ensure that the monetary value of the distributed marketing offers does not exceed the available marketing offer budget. Some embodiments of the inventive subject matter also include techniques for dynamically adjusting marketing offer terms and/or terminating the marketing offer. In some embodiments, the marketing server can modify and/or configure marketing offers dynamically based on the player's spending habits, the marketing offer redemption rate, and the availability of the marketing offer budget. This can help ensure efficient management of marketing offer budgets, while rewarding players for their loyalty and business.

Operating Environment

This section describes an example operating environment and presents structural aspects of some embodiments. This section includes discussion about wagering game network architectures.

Figure 1:
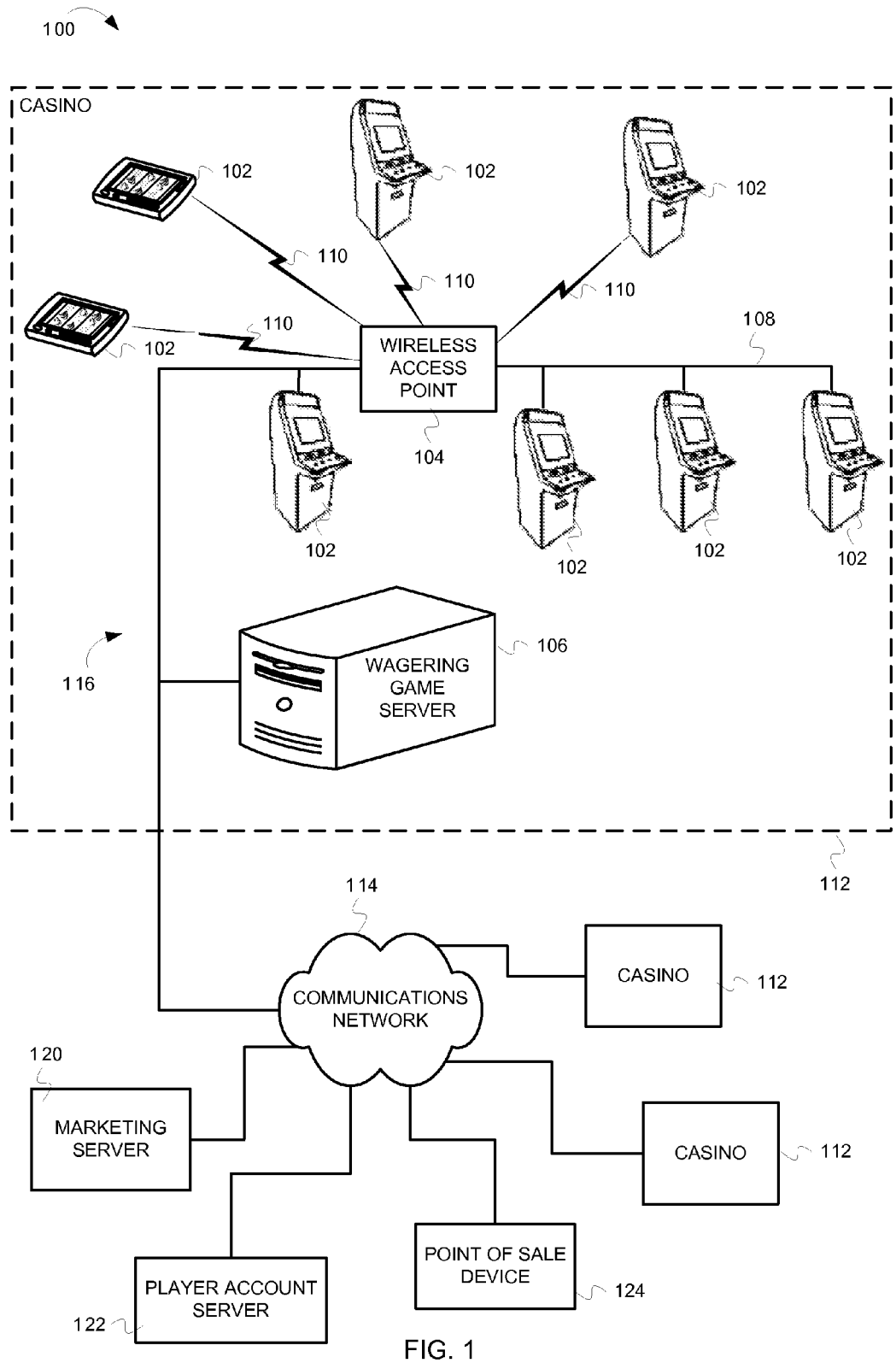
FIG. 1 is a block diagram illustrating a wagering game network, according to example embodiments of the invention.

FIG. 1 is a block diagram illustrating a wagering game network 100, according to example embodiments of the invention. As shown in FIG. 1, the wagering game network 100 includes a plurality of casinos 112 connected to a communications network 114. The plurality of casinos 112 are also connected to a marketing server 120, a player account server 122, and a point of sale device 124 via the communications network 114.

Each casino 112 includes a local area network 116, which includes an access point 104, a wagering game server 106, and wagering game machines 102. The access point 104 provides wireless communication links 110 and wired communication links 108. The wired and wireless communication links can employ any suitable connection technology, such as Bluetooth, 802.11, Ethernet, public switched telephone networks, SONET, etc. In some embodiments, the wagering game server 106 can serve wagering games and distribute content to devices located in other casinos 112 or at other locations on the communications network 114.

The player account server 122 stores player information identifying the player, such as biometric information, player name and identification number, voice characteristics (e.g., for voice recognition), handwriting characteristics (e.g., for signature recognition), etc. The player account server 122 can also store a record of transactions made by the player, money won or lost at the wagering game machines 102, etc. The wagering game server 106 and/or the wagering game machine 102 requests and receives player information from the player account server 122 in response to the player logging-in to the wagering game machine 102. For example, when the player swipes a player card on the wagering game machine 102, the wagering game machine 102 captures the player card number. The wagering game machine 102 or the wagering game server 106 transmits the player card number to the player account server 122 to determine whether the player is authorized to log-in to the wagering game machine 102 to play a wagering game.

The point of sale device 124 can reside in retail establishments (e.g., hotels, restaurants, shops, etc.) and interface with the marketing server 120. Players can interact with the point of sale device 124 for monetary transactions, such as purchasing merchandise, transferring funds, converting funds from one currency to another, etc. The point of sale device 124 can also record and track purchases, generate marketing events based on a set of pre-defined rules, and transmit the generated marketing events to the marketing server 120 and other devices. Point of sale devices can also receive marketing offers from the marketing server 120, and present the marketing offers to players.

The marketing server 120 can receive notifications of marketing events (e.g., game-based events, time based events, account based events, etc.) from the player account server 122, the point of sale device 124, the wagering game server 106, and any other suitable device. The marketing server 120 can identify events that satisfy terms of a marketing offer. In turn, the marketing server 120 can presents the marketing offer to the player. For example, the marketing server 120 may receive a game-based event from the wagering game server 106, where the event indicates that a player has spent a predefined amount of money. The marketing server 120 may determine that, in spending the predefined amount of money, the player is eligible for a marketing offer. The marketing server 120 may direct the wagering game server 106 to present the marketing offer on the wagering game machine 102. Alternatively, the marketing server 120 may itself direct the wagering game machine 102 to present the marketing offer.

The wagering game machines 102 described herein can take any suitable form, such as floor standing models, hand-held mobile units, bartop models, workstation-type console models, etc. Further, the wagering game machines 102 can be primarily dedicated for use in conducting wagering games, or can include non-dedicated devices, such as mobile phones, personal digital assistants, personal computers, etc. In one embodiment, the wagering game network 100 can include other network devices, such as wide area progressive servers, player-tracking servers, and/or other devices suitable for use in connection with embodiments of the invention.

In some embodiments, wagering game machines 102 and wagering game servers 106 work together such that a wagering game machine 102 can be operated as a thin, thick, or intermediate client. For example, one or more elements of game play may be controlled by the wagering game machine 102 (client) or the wagering game server 106 (server). Game play elements can include executable game code, lookup tables, configuration files, game outcome, audio or visual representations of the game, game assets, or the like. In a thin-client example, the wagering game server 106 can perform functions such as determining game outcome or managing assets, while the wagering game machine 102 can present a graphical representation of such outcome or asset modification to the user (e.g., player). In a thick-client example, the wagering game machines 102 can determine game outcomes and communicate the outcomes to the wagering game server 106 for recording or managing a player's account.

In some embodiments, either the wagering game machines 102 (client) or the wagering game server 106 can provide functionality that is not directly related to game play. For example, account transactions and account rules may be managed centrally (e.g., by the wagering game server 106) or locally (e.g., by the wagering game machine 102). Other functionality not directly related to game play may include power management, presentation of advertising, software or firmware updates, system quality or security checks, etc.

Any of the wagering game network components (e.g., the wagering game machines 102) can include hardware and machine-readable media including instructions for performing the operations described herein.

Although FIG. 1 describes devices (e.g., the point of sale device 124, the player account server 122, and the wagering game server 106) interacting with the marketing server 120 via the communications network 114, some of the operations for dynamically generating and distributing marketing offers may be performed by the devices. For example, a restaurant's point of sale device 124 may comprise a local marketing unit (not shown) for dynamically generating marketing offers and/or providing discounts at the point of sale. The marketing server 120 may allot a portion (e.g., 10% of the marketing offer budget) of the marketing offer budget to the local marketing unit on the restaurant's point of sale device 124. A system administrator may configure the local marketing unit on the restaurant's point of sale device to automatically generate and apply discounts to sales over a predefined amount. The local marketing unit may also apply, as part of a marketing offer, different discounts to different levels of sales. The local marketing unit may automatically stop offering discounts when the allotted budget (i.e., the allotted portion of the marketing offer budget) is exhausted.

While FIG. 1 describes an example wagering game machine network architecture, this section continues with a description of interactions between various units in the wagering game machine network.

Figure 2:
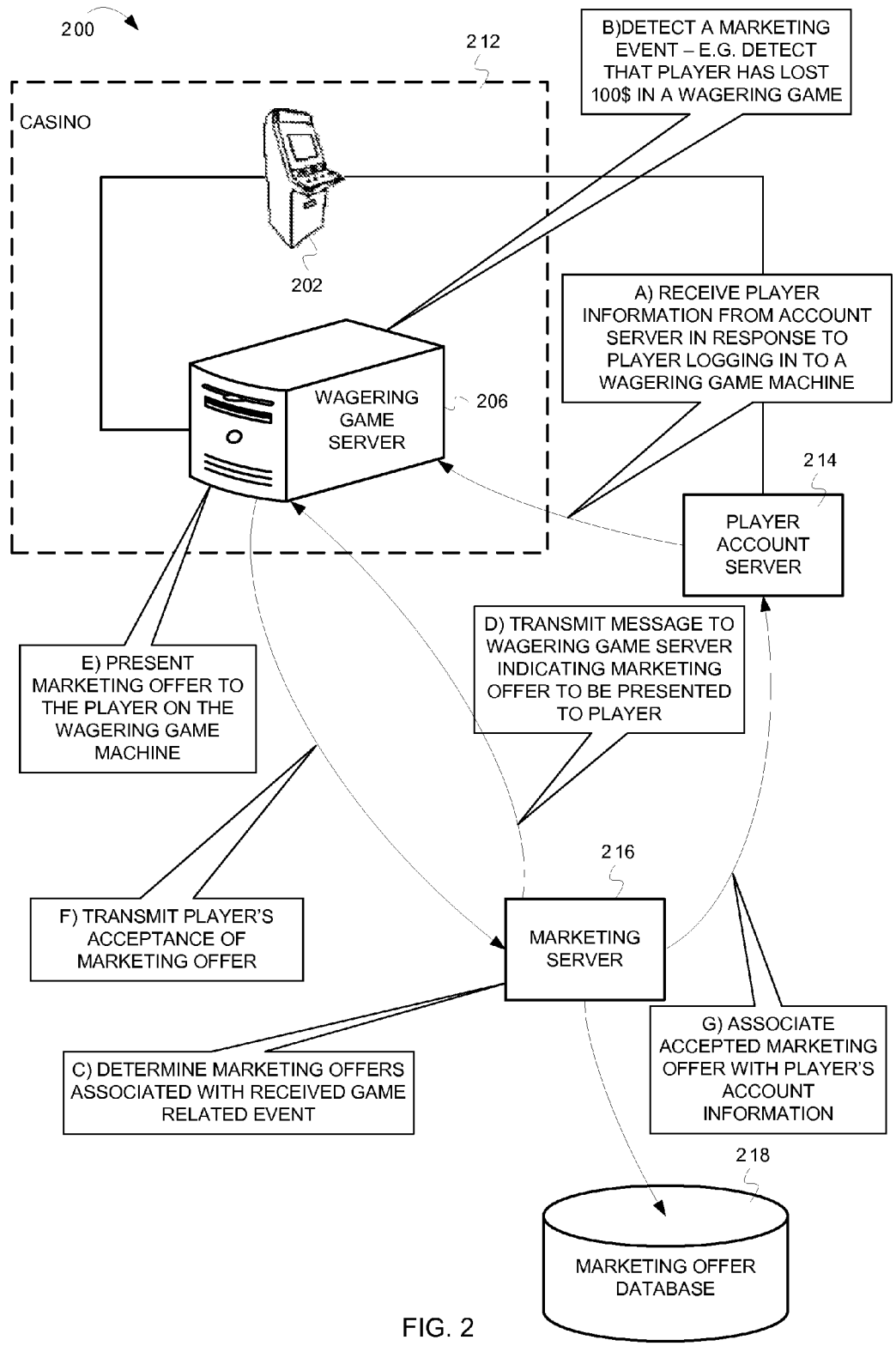
FIG. 2 is an example conceptual diagram illustrating operations for presenting marketing offers.

FIG. 2 is an example conceptual diagram illustrating operations for presenting marketing offers. FIG. 2 depicts a wagering game machine 202 coupled with a wagering game server 206. The wagering game server 206 communicates with a marketing server 216 and a player account server 214. The marketing server 216 is coupled with a marketing offer database 218.

At stage A, the wagering game server 206 receives player information from the account server 214 in response to a player logging into the wagering game machine 202. For example, the player may log into the wagering game machine 202 using a player identification card, entering a password on a keypad, biometric scanning (e.g., fingerprint scan), handwriting verification, voice recognition, etc. The wagering game server 206 can capture the player's login information (e.g., voice characteristics, biometric data, player card information, etc.) and transmit the player's login information to the player account server 214. The player account server 214, in turn, can determine whether the player is a registered player and transmit player information (e.g., account balance, pending marketing offers, etc.) to the wagering game server 206 for display on the wagering game machine 202.

At stage B, the wagering game server 206 detects a marketing event. For example, as depicted in FIG. 2, the wagering game server 206 detects that the player has lost $100 in a wagering game presented on the wagering game machine 202. The wagering game server 206 may monitor the player's activities on the wagering game machine 202 to identify the marketing event. In some implementations, a system administrator may configure the wagering game machine 202 to notify the wagering game server 206 when a marketing event occurs.

In some implementations, the wagering game server 206 may communicate directly with the marketing server 216. In another implementation, the wagering game server 206 can communicate with the marketing server 216 using a publisher/subscriber communication model. In accordance with the publisher/subscriber communication model, the wagering game server 206 (i.e., a publisher) may not transmit messages (e.g., the marketing event, player information, etc.) directly to the marketing server 216 (i.e., the subscriber). Instead, the wagering game server 206 publishes messages to one or more logical channels when certain marketing events occur (e.g., the player spending more than a predefined amount of money). The marketing server 216 listens on the logical channels and receives the published information. In some implementations, a third party server or daemon may notify the marketing server 216 when the wagering game server 206 or other publisher publishes a message on the logical channels.

At stage C, the marketing server 216 determines marketing offers associated with the marketing event. The marketing server 216 can compare the marketing event with offer terms associated with available marketing offers and determine whether the player is eligible to receive one of the available marketing offers. The marketing server 216 may access the marketing offer database 218 to determine the marketing offers for which the player qualifies. The marketing offers can be stored as a set of marketing offer terms. The marketing offer terms can comprise requirements that players must satisfy in order to receive the marketing offer. The marketing offer terms can also indicate a monetary value and an expiration term associated with the marketing offer.

At stage D, the marketing server 216 transmits a message to the wagering game server 206 and indicates a marketing offer that should be presented, on the wagering game machine 202, to the player. In some implementations, the marketing server 216 may publish information on a logical channel, indicating the marketing offer to be presented. The wagering game server 206 can monitor the logical channel and retrieve the published information from the logical channel.

At stage E, the wagering game server 206 presents the marketing offer to the player on the wagering game machine 202. In some implementations, the marketing server 216 may transmit the marketing offer to be presented. For example, the marketing server 216 may transmit a file (e.g., an XML file, an HTML file, etc.) describing the marketing offer to be presented. In another implementation, the marketing server 216 may identify the marketing offer to be presented, e.g., by means of a marketing offer identification number. In other embodiments, the marketing server 216 may transmit a uniform resource locator (URL) at which the offer can be accessed. The wagering game server 206 may access the marketing offer database 218, retrieve the identified marketing offer, and present the marketing offer on the wagering game machine 202.

At stage F, the wagering game server 206 receives (from the wagering game machine 202) and transmits the player's acceptance of the marketing offer to the marketing server 216.

At stage G, the marketing server 216 associates the accepted marketing offer with the player's account information. For example, the marketing server 216 can direct the player account server 214 to store the accepted marketing offer as part of the player information associated with the player's account. The marketing offer may be redeemed when the player swipes his/her player identification card. If the marketing server 216 determines that the player has rejected the marketing offer, the marketing server 216 can identify and present an alternate marketing offer. The marketing server 216 may also record the player's acceptance or rejection of marketing offers to tailor future marketing offers to the player's preferences. Furthermore, almost immediately after a player accepts an offer, the marketing server 216 can determine the remaining offer budget. If the offer budget has been exhausted, the marketing server 216 can cease making offers. Alternatively, the marketing server 216 can modify the offer, such as by reducing the offer's value, so it can present the offer to more players. These and other embodiments will be described in more detail below.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in any flow diagram.

Figure 3:
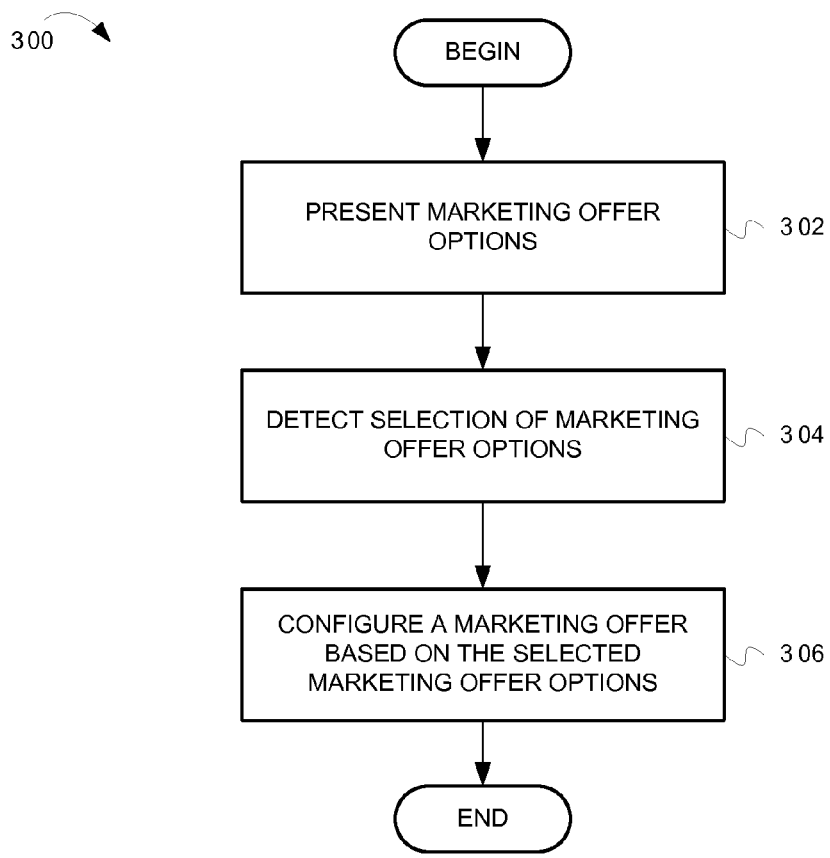
FIG. 3 is a flow diagram illustrating example operations for configuring marketing offers.

FIG. 3 is a flow diagram illustrating example operations for configuring marketing offers. Flow 300 will be described in reference to the block diagram of FIG. 1. The flow 300 begins at block 302.

At block 302, a marketing server 120 enables a system administrator to configure a marketing offer by presenting marketing offer options. For example, the marketing sever 120 may present the marketing offer options on a marketing server console, a handheld display device connected to the marketing server 120, etc. The marketing server 120 may present the marketing offer options by means of a drop down menu or other graphical object and allow a user or system administrator to select one or more marketing offer options to configure a marketing offer. The system administrator can employ the marketing offer options to configure marketing offers for various marketing events.

Marketing offer options can indicate an expiration time frame associated with the marketing offer. For example, the system administrator can indicate that marketing offers for a 50% discount on a midnight buffet may be distributed only at midnight and are valid from midnight to 2 am. The system administrator may also configure the server 120 to identify one or more equivalent marketing offers. The system administrator can also use the marketing offer options to describe conditions that players must satisfy to qualify for a marketing offer. In some embodiments, the system administrator can use the marketing offer options to configure a wagering game server 106 and/or a wagering game machine 102 to generate a game-based event in response to a player spending, winning, or losing a predefined amount of money. As another example, the system administrator can use the marketing offer option to configure the wagering game server 106 to generate a game-based event if the player logs on to a specified wagering game machine 102 or if the player gets a specific game result, such as a "royal flush" while playing a poker game on the wagering game machine 102. The system administrator can also use the marketing offer options to modify terms of on-going marketing offers. The flow continues at block 304.

Figure 5:
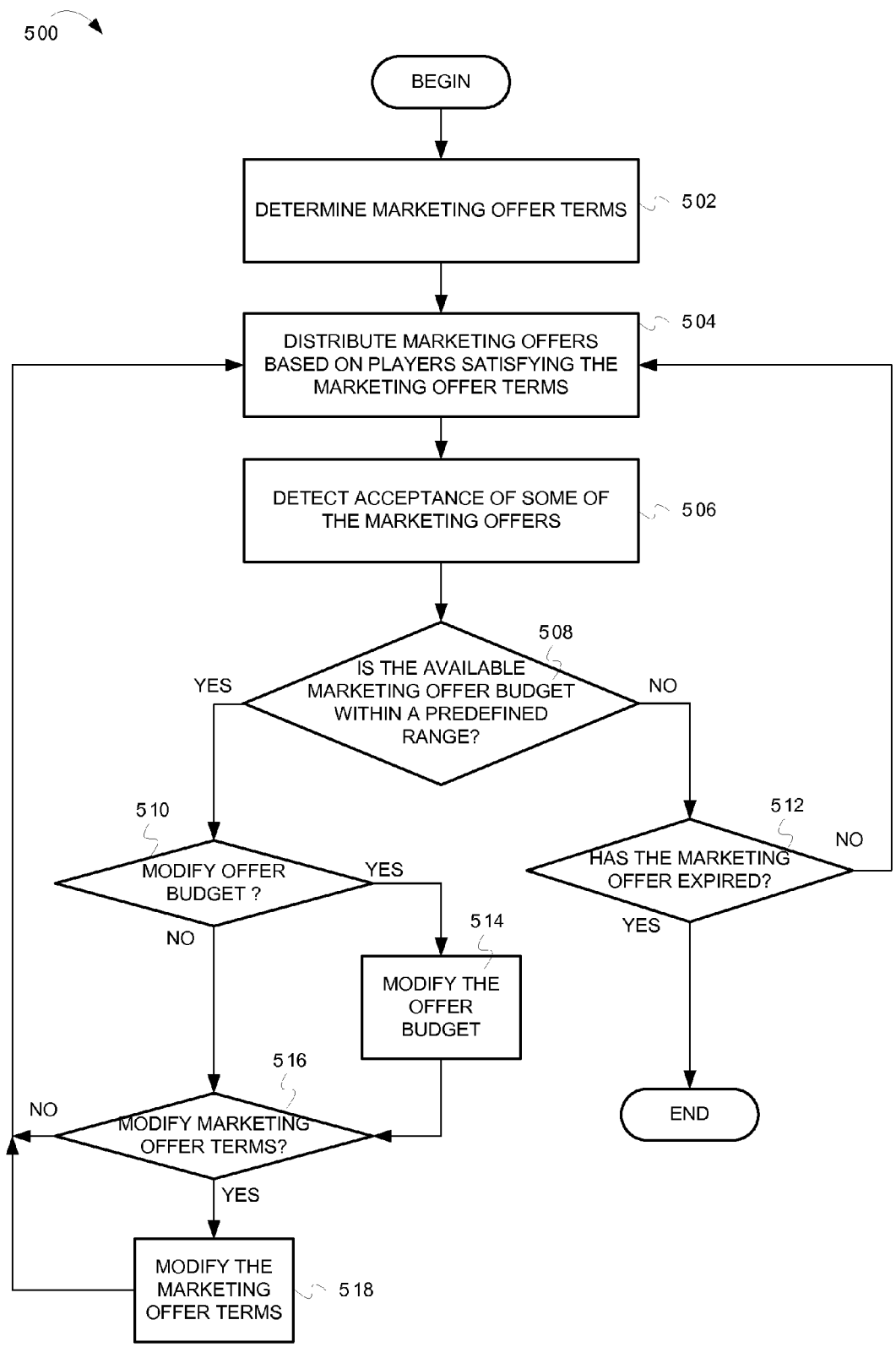
FIG. 5 is a flow diagram illustrating example operations for modifying marketing offers based on the availability of a marketing offer budget.

At block 304, the marketing server 120 detects a selection of one or more of the marketing offer options presented at block 302. In addition to selecting marketing offer options and configuring marketing offer terms, the system administrator can also configure the marketing server 120 to modify a marketing offer budget, depending on the casino's incoming revenue, expenditures, etc. The system administrator may also allocate portions of the marketing offer budget to different types of marketing events and marketing offers. For example, the system administrator can allocate two thirds of the total marketing offer budget to marketing offers for game-based events, one sixth of the marketing offer budget to restaurant based marketing offers, etc. FIG. 5 further describes operations for dynamically modifying the terms of the marketing offers and/or the marketing offer budget.

Additionally, the marketing server 120 may also provide the system administrator with functionality for writing software code or programming hardware (e.g., using a programmable chip, a software module, a plug-in, etc.) to enforce marketing offer rules and describe marketing offer terms. The flow continues at block 306.

At block 306, the marketing server 120 configures a marketing offer based on the selected marketing offer options. The marketing offers may be stored as part of the marketing server 120 or in a marketing offer database separate from the marketing server 120. After a marketing offer is configured, the marketing server 120 can receive one or more marketing events, compare the marketing events with the marketing offer terms, identify one or more marketing offers that the player is qualified to receive, and present the identified marketing offers.

The marketing server 120 can operate in conjunction with the wagering game server 106 to modify the marketing offer based on players' spending habits and/or the available marketing offer budget, and to present the modified marketing offer to players. This can help safeguard against players with erratic spending habits. For example, the player account server 122 may determine and notify the marketing server 120 that a player spends $100 in slots every week. To entice the player to spend more money on slots, the marketing server 120 may present the player with a marketing offer doubling the money he/she spends on the slot wagering games. However, the marketing offer budget may be exceeded if the player spends a larger amount of money (e.g., $10,000) on the slot wagering games and the marketing server 120 doubles the amount spent by the player. Thus, to safeguard against such erratic player behavior, the marketing server 120 can configure the marketing offer to double the player's spending for amounts up to $500. If the player exceeds the $500 threshold, the marketing server 120 can dynamically reconfigure the marketing offer to match the amount spent by the player (or match some portion of the amount).

The marketing server 120 can also configure the marketing offers to reward players for their loyalty, for spending a predefined amount of money, for playing particular types of wagering games, for playing wagering games for a predefined period of time, etc. Dynamically determining and presenting marketing offers to players based the players' spending habits rewards players who play wagering games that may not typically have marketing offers associated with the wagering games. Thus, the marketing server 120 may present marketing offers to players who play the wagering games on a regular basis. For example, the marketing server 120 may distribute marketing offers to players who play wagering games for three consecutive days (or any other predefined period of time). As another example, the marketing server 120 may present more valuable marketing offer to a player with a specified account balance (as indicated by the player account server 122) and a less valuable marketing offer to a player with a lower account balance.

The marketing server 120 can also configure and present marketing offers to promote services offered by the casino. For example, the marketing server 120 may distribute marketing offers for free upgrades to a hotel suite to players with an account balance above a threshold. As another example, the marketing server 120 may distribute marketing offers for a $100 shopping spree to players who spend more than a predefined amount. From block 306, the flow ends.

Figure 4:
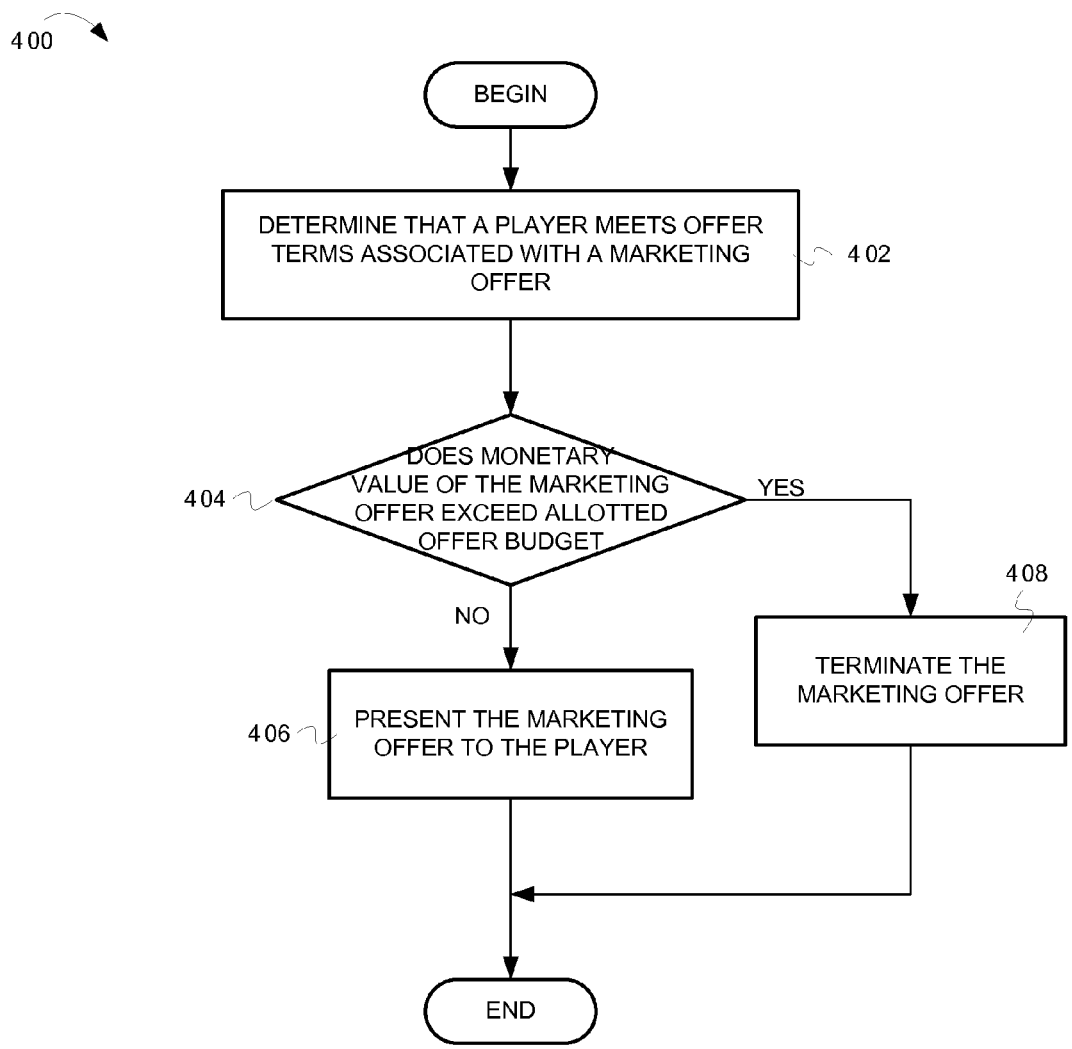
FIG. 4 is a flow diagram illustrating example operations for presenting and terminating marketing offers based on the availability of a marketing offer budget.

FIG. 4 is a flow diagram illustrating example operations for presenting and terminating marketing offers based on the availability of a marketing offer budget. Flow 400 will be described in reference to the block diagram of FIG. 1. The flow 400 begins at block 402.

At block 402, the marketing server 120 determines that a player meets offer terms associated with a marketing offer ("marketing offer terms"). Each of the servers (e.g., the wagering game server 106, the player account server 122, etc.) can keep track of the player's activities and notify the marketing server 120 when an event that warrants a marketing offer occurs. As described earlier, the marketing server 120 can also subscribe to one or more logical channels on which a wagering game server 106, a player account server 122, and/or a point of sale device 124 publish information in accordance with publication rules. For example, the wagering game server 106 may publish player information, to a channel, when the player plays a wagering game for a specified time period or loses a specified amount of money. As another example, the point of sale device 124 at a restaurant may publish information to a channel if the player spends a specified amount of money on food. As an example, when a player swipes a player identification card at a restaurant, the restaurant's point of sale device 124 can publish player information to a channel to which the marketing server 120 subscribes.

The marketing server 120 can retrieve the published information and determine whether the player is eligible for a marketing offer. The marketing server 120 may determine that the player has spent $500 at the casino and is currently at a restaurant. The marketing server 120 may determine, based on the player information and the marketing offer terms, that the player qualifies for a 50% discount on the cost of a buffet at the restaurant. As another example, the marketing server 120 may present a marketing offer based on a notification from the player account server 122 indicating registration of a new player.

In some implementations, the marketing server 120 may receive information about every transaction and event and determine, based on the transactions and events, whether the player should receive the marketing offer. In another implementation, the system administrator may configure the point of sale device 124, the player account server 122, and/or the wagering game server 106 to publish information subject to rules. For example, the point of sale device 124 may publish player identification and transaction information if the player swipes a player identification card and makes a purchase greater than a specified amount. As another example, the player account server 122 may notify the marketing server 120 when the player signs up for a credit card provided by the casino. The flow continues at block 404.

At block 404, the marketing server 120 determines whether the monetary value of the marketing offer exceeds the allotted marketing offer budget. In performing operations described by block 404, the marketing server 120 tries to ensure that the marketing offer budget is not surpassed. The marketing server 120 may determine, before distribution of the marketing offers, whether the monetary value of the marketing offers to be distributed exceeds the available marketing offer budget. If the marketing server 120 determines that the monetary value of the marketing offer does not exceed the allotted marketing offer budget, the flow continues at block 406. Otherwise, the flow continues at block 408.

At block 406, the marketing server 120 presents the marketing offer to the player. The marketing server 120 may direct the wagering game server 106 and/or the wagering game machine 106 to present the marketing offer on the wagering game machine's display unit. The marketing server 120 can also direct the point of sale devices 124 to apply a marketing offer (e.g., a discount at a restaurant, etc.) to the final sales price. The marketing server 120 may also interface with the player account server 122 and direct the player account server 122 to store the marketing offers as part of the player information.

The marketing server 120 may present marketing offers based on the wagering game machine 102 in use. The marketing server 120 may also present marketing offers depending on the location of the wagering game machine, type of game being played on a set of pre-selected or randomly selected wagering game machines 102, the wagering game machine model, etc. For example, the marketing server 120 may present a first marketing offer to players playing poker on the wagering game machines 102 and a second marketing offer to players playing slots on the wagering game machines 102. The marketing server 120 may also present marketing offers that are valid for only certain days or times of the day. For example, the marketing server 120 may present marketing offers to all players playing Monopoly-branded games from Monday to Friday between noon and 4 pm. Thus, during these times, if a player logs into a wagering game machine 102 presenting a non-Monopoly-branded poker game, the marketing server 120 will not present the marketing offer. However, if the player logs into another wagering game machine 102 presenting a Monopoly-branded game, the marketing server 120 will present the marketing offer. As another example, the marketing server 120 may distribute marketing offers for a 50% discount on a midnight buffet for players at wagering game machines 102 from midnight to 2 am.

The marketing server 120 may present marketing offers with different monetary values to players depending on how long the players have been playing the wagering game, the amount of money the players have spent over a period of time, the amount of money the players have won/lost, etc. For example, the marketing server 120 may present marketing offer for 5$ of free game play to a player who spent $500 on the wagering game machines 102, a marketing offer for $10 of free game play to a player who spent $800 on the wagering game machines 102, etc. The marketing server 120 can distribute marketing offers to reward players based on the amount of money spent on various casino activities (e.g., playing wagering games, eating at the casino's restaurants, shopping at the gift shop, etc.).

The marketing offers may not be restricted to game-related offers, such as receiving money for playing wagering games. Because the marketing server 120 connects to the point of sale devices 124 at retail locations, the marketing server 120 can distribute marketing offers for restaurants, shops, hotels, etc. For example, if the marketing server 120 determines that a player spent $500 shopping at the casino's gift shop, the marketing server 120 may present the player with a marketing offer for a $30 free lunch at the casino's new restaurant. As another example, the marketing server 120 present a marketing offer in response to receiving an event indicating that a player's restaurant bill has exceeded a predefined threshold.

The marketing server 120 may present the marketing offers to the player after the player indicates that he/she wants to log-off the wagering game machine 102. In other implementations, the marketing server 120 can present marketing offers on the wagering game machine 102 at regular intervals to entice the player to keep playing the wagering games. In other implementations, the marketing server 120 can present marketing offers on the wagering game machine 102 to urge players to shop at the casino's shopping center, try a new restaurant, watch an entertainment show at the casino, etc. In some implementations, the marketing server 120 may also direct the player account server 122 to associate a marketing offer with player information on the player account server 122. The system may present the marketing offer when the player logs into the wagering game machine 102. After the marketing server 120 presents a marketing offer to the player, the flow ends.

At block 408, when the marking offer exceeds the marketing budget, the marketing server 120 terminates the marketing offer. The marketing server 120 terminates the marketing offer if the marketing server 120 determines that the monetary value of the marketing offer exceeds the available offer budget. The marketing server 120 may not present an offer to the player or may present an alternate marketing offer. From block 408, the flow ends.

FIG. 5 is a flow diagram illustrating example operations for modifying marketing offers based on the availability of a marketing offer budget. Flow 500 will be described with reference to the block diagram of FIG. 1. The flow 500 begins at block 502.

At block 502, the marketing server 120 determines marketing offer terms. The marketing offer terms can comprise requirements that players must satisfy before the marketing server presents the player with a marketing offer. The marketing offer terms can also indicate a monetary value and an expiration term associated with the marketing offer. The flow continues at block 504.

At block 504, the marketing server 120 distributes marketing offers based on one or more players satisfying the marketing offer terms. Before distributing the marketing offers, the marketing server 120 may also determine whether the marketing offer has expired. In some implementations, the marketing server 120 may query other information servers (e.g., a wagering game server 106, a player account server 122, a point of sale device 124, etc.) to determine whether the one or more players satisfy the marketing offer terms. For example, the marketing server 120 may query the wagering game server 106 to identify players who are eligible to receive a marketing offer and accordingly distribute the marketing offer. In another implementation, the marketing server 120 may subscribe to channels to which the information servers publish player information and marketing events. The marketing server 120 may monitor these channels and wait for the information servers to publish marketing events indicating that one or more players meet the marketing offer terms. For example, the marketing server 120 may receive game-based events, from the wagering game server 106, indicating players whose expenses have exceeded a predefined threshold as described by the marketing offer terms. The marketing server 120 may then distribute the marketing offer to the players indicated by the wagering game server 106.

A user or system administrator may configure the marketing server 120 to analyze and distribute one or more of the marketing offers at a regular intervals irrespective of game-based or time based events received by the marketing server 120. For example, the marketing server 120 may distribute marketing offers for a free midnight snack to all players playing wagering games at 2 am. To ensure compliance with the available marketing offer budget, the marketing server 120 may also determine whether the total monetary value of the marketing offers to be distributed exceeds the available marketing offer budget. The marketing server 120 may modify marketing offer terms or not distribute the marketing offers to ensure that the number of marketing offers distributed is such that the total value of the distributed marketing offers does not exceed the available marketing offer budget. The flow continues at block 506.

At block 506, the marketing server 120 detects acceptance of some of the marketing offers distributed at block 504. Because a player may have the option of accepting or refusing the presented marketing offers, not all the players who receive the distributed marketing offers may accept the marketing offers. The player may reject the presented marketing offer because he/she does not like the presented marketing offer or wants to wait for a more appealing marketing offer. For example, the player may reject a marketing offer for a free steak dinner because the player does not eat meat. As another example, the player may reject a marketing offer for a $5 discount on a restaurant buffet because the monetary value of discount is not sufficient to entice the player to quit playing wagering games. After detecting acceptance of some of the marketing offers, the marketing server 120 may reduce the available marketing offer budget by the value of the accepted marketing offers. The marketing server 120 may also store the accepted or rejected offers as part of the player's preferences. The marketing server 120 may use the player's preferences to determine types of rewards preferred by the players. For example, the marketing server 120 may analyze the acceptance or rejection rate of a set of marketing offers and determine that players tend to accept marketing offers for free game money and reject marketing offers for a 50% discount on a lunch buffet. The marketing server 120 may or may not present an alternate marketing offer if the player rejects the presented marketing offer. In some embodiments, the marketing server works with the account server or other devices to access player preferences and other information. The flow continues at block 508.

At block 508, the marketing server 120 determines whether the available marketing offer budget is within a predefined range. The marketing server 120 may determine whether the total monetary value of the accepted marketing offers is below a predefined threshold of the available marketing offer budget. The marketing server 120 may perform these checks to determine how much of the marketing offer budget is available and accordingly determine whether the marketing offer terms should be modified. Casino managers can configure the marketing server 120 to determine the remaining marketing budget at any suitable time (e.g., after each offer is accepted, periodically, in response to certain events, etc.). Thus, embodiments of the marketing server keep offers within their budget. If the marketing server 120 determines that the available offer budget is below a threshold level, the flow continues at block 510. Otherwise, the flow continues at block 512.

At block 510, the marketing server 120 determines whether the marketing offer budget should be modified. The marketing server 120 may dynamically modify, without user input, the marketing offer budget in response to variations in the casino's revenue. For example, the marketing offer budget may be set at 1% of the casino's total incoming revenue. The marketing server 120 may increase the available offer budget if there is an increase (e.g., a 10% increase) in the casino's incoming revenue. On the other hand, the marketing server 120 may decrease the available marketing offer budget if there is a decrease in the casino's incoming revenue or an increase in expenditure (e.g., the casino having to pay large sums of money to the players, etc). The marketing server 120 can increase or decrease marketing offer budgets based on preset rules or in an on-demand fashion (i.e., in response to input though a user interface). If the marketing server 120 determines that the marketing offer budget should be modified, the flow continues at block 514. Otherwise, the flow continues at block 516.

At block 514, the marketing server 120 modifies the marketing offer budget. As described earlier, the marketing server 120 may increase or decrease the marketing offer budget in response to variations in the casino's incoming revenue. The marketing server 120 can modify the marketing offer budget while maintaining the marketing offer budget at a constant percentage of the casino's total incoming revenue. The flow continues at block 516.

At block 516, the marketing server 120 determines whether the marketing offer terms should be modified. The marketing server 120 can modify the marketing offer terms to reflect the modified marketing offer budget (see block 514). Alternately, the marketing server 120 can also modify the marketing offer terms to ensure that the total monetary value of the distributed marketing offers does not exceed the available marketing offer budget (e.g., an offer is for $50, but the budget only has $40 remaining) In some embodiments, the marketing server 120 can modify the offer terms for any suitable reason (e.g., reducing the offer's monetary value to make the offer available to more people). If the marketing server 120 determines that the marketing offer terms should be modified, the flow continues at block 518. Otherwise, the flow continues at block 504.

At block 518, the marketing server 120 modifies the marketing offer terms. In modifying the marketing offer terms, the marketing server 120 may increase or decrease the monetary value of the marketing offer. For example, the marketing server 120 may reduce a $20 restaurant discount to a $10 restaurant discount. The marketing server 120 may also increase or reduce time intervals at which the marketing offers are presented. For example, instead of presenting marketing offers for a discounted buffet every fifteen minutes from noon to 2 pm, the marketing server 120 may distribute these marketing offers only once at noon. The marketing server 120 may keep the monetary value of the marketing offer constant and change the eligibility requirements of the marketing offer. In other words, the marketing server 120 may also increase or decrease threshold limits (player spending limits) at which it distributes the marketing offers. For example, the marketing server 120 may increase the threshold limit from $250 to $500. Thus, to avail of the marketing offers, players may be required to spend at least $500.

The marketing server 120 can also collect and analyze information about distributed and redeemed marketing offers and modify the marketing offer terms accordingly. The marketing server 120 can modify the marketing offers terms, modify the marketing offer budget, terminate a marketing offer, and present marketing offers dynamically based on the marketing offer redemption rate. For example, if the marketing server 120 determines that players are rejecting a particular type of marketing offer (or if the marketing offer redemption rate is low), the marketing server 120 can increase the monetary value of the marketing offer to entice players to accept the marketing offer. The marketing server 120 may reduce the monetary value of the marketing offer once the available marketing offer budget falls below a first threshold value or if the if the marketing offer redemption rate is high. The marketing server 120 may then terminate the marketing offer if the available marketing offer budget falls below a second threshold value. After the marketing server 120 modifies the marketing offer terms, the flow continues at block 504, where the marketing server 120 distributes marketing offers to players who satisfy the marketing offer terms.

At block 512, the marketing server 120 determines whether the marketing offer has expired. The marketing server 120 may compare the expiration time frame in the marketing offer terms with the current date and time to determine whether the marketing offer has expired. If the marketing server 120 determines that that marketing offer is still valid, the flow continues at block 504, where the marketing server 120 distributes marketing offers to players who satisfy the marketing offer terms. If the marketing server 120 determines that the time frame for redeeming the marketing offer has expired, the flow ends.

Although flow 500 depicts the marketing server 120 modifying the marketing offer budget every time the marketing sever 120 distributes one or more marketing offers, modification of the marketing offer budget (e.g., blocks 510 and 514) may not be influenced by the distribution of marketing offers. Instead, the marketing server 120 may be configured to modify offers in other suitable ways, such as by periodically determining the available marketing offer budget, comparing the available marketing offer budget with the casino's total revenue, and accordingly modifying the marketing offer budget.

In addition to being able to modify offers, some embodiments of the marketing server can allow players to choose between different marketing offers. Thus, players can choose marketing offers they find most valuable. The discussion of FIG. 6 describes this in more detail.

Figure 6:
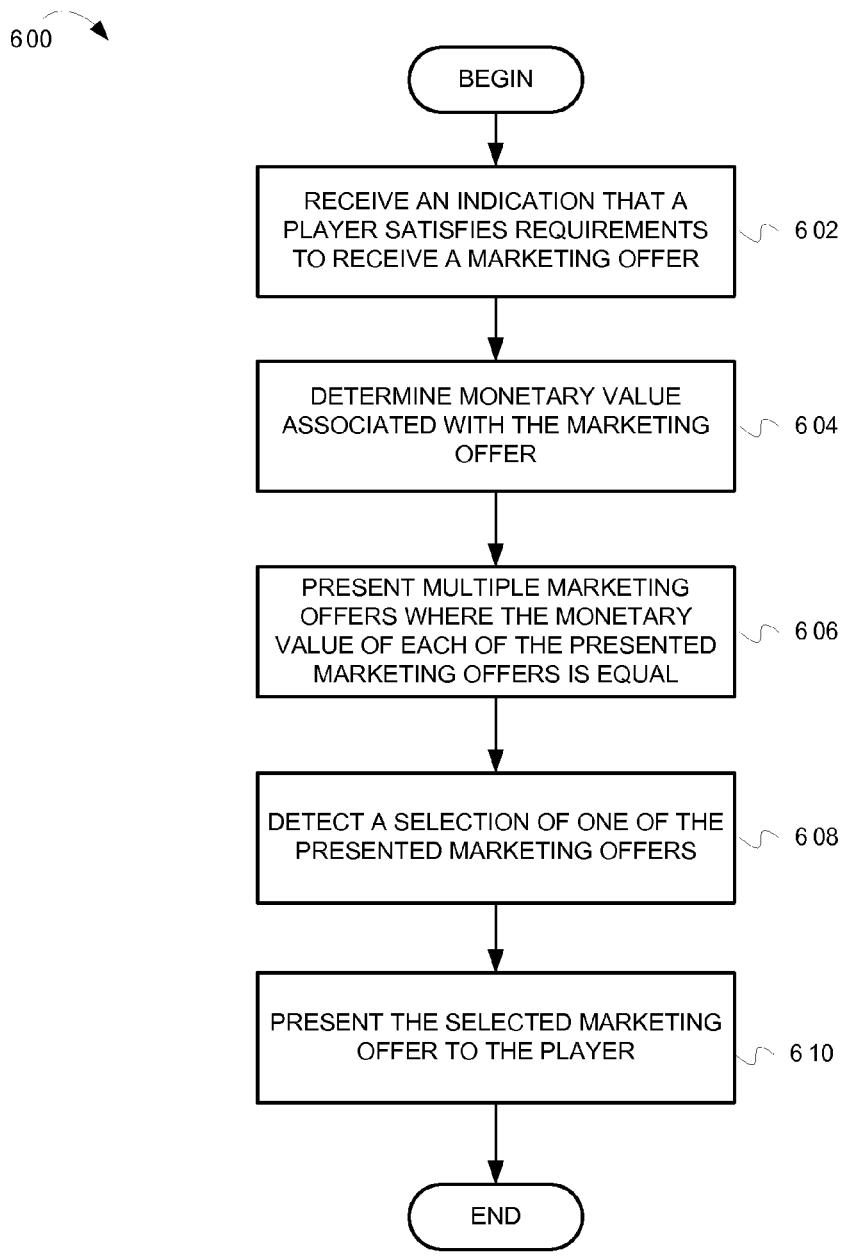
FIG. 6 is a flow diagram illustrating example operations for presenting a multiplicity of marketing offers.

FIG. 6 is a flow diagram illustrating example operations for presenting a multiplicity of marketing offers. Flow 600 will be described with reference to the block diagram of FIG. 1. The flow 600 begins at block 602.

At block 602, the marketing server 120 receives an indication that a player satisfies requirements for receiving a marketing offer. The marketing offer terms may describe requirements that the player must satisfy to receive the marketing offer. For example, the wagering game server 106 may detect a player logging into a wagering game machine 102. The wagering game server 106 can publish, to a logical channel, player identification information, wagering game machine information, information identifying a wagering game being played on the particular wagering game machine, etc. For example, the wagering game server 106 may indicate the player's identification number and indicate that the player is playing poker on a particular wagering game machine. The marketing server 120 can subscribe to the logical channel and receive the published information. The marketing server 120 can compare the published information with marketing offer terms and determine that any player playing poker on the wagering game machine 102 satisfies the requirements for receiving a marketing offer for $20 of free game credits. The flow continues at block 604.

At block 604, the marketing server 120 determines a monetary value associated with the marketing offer. The marketing offer terms may indicate a monetary value associated with the marketing offer. In the example described with reference to block 602, the monetary value of the marketing offer is $20. After the marketing server 120 determines a monetary value associated with the marketing offer, the flow continues at block 606.

At block 606, the marketing server 120 presents multiple marketing offers where the monetary value of each of the presented marketing offers is equal. The marketing server 120 may access a marketing offer database to determine one or more other marketing offers with a monetary value equal to the monetary value determined at block 604. For example, the marketing server 120 may determine that the marketing offer for $20 of free game credits is equivalent to either a $30 discount at a restaurant or a $40 upgrade to a bigger hotel room. The marketing server 120 may direct the wagering game server 106 and/or the wagering game machine 102 to present the equivalent marketing offers on the wagering game machine's display unit. In some implementations, the marketing server 120 may select alternate equivalent marketing offers based on the player's preferences. The marketing server 120 may determine the player's preferences based on the player's history of accepting or rejecting different types of marketing offers. In some implementations, the wagering game server 106 may present the marketing offers simultaneously and prompt the player to choose one of the presented marketing offers. In other implementations, the wagering game server 106 may present the marketing offers in succession and prompt to the user to select or reject the marketing offer. The flow continues at block 608.

At block 608, the marketing server 120 detects a selection of one of the presented marketing offers. The marketing server 120 may monitor user input at the wagering game machine 102 or may receive a notification from the wagering game machine 102 and/or the wagering game server 106 indicating the selected marketing offer. The flow continues at block 610.

At block 610, the marketing server 120 presents the selected marketing offer to the player. The marketing server 102 may also record details about the selected marketing offer in the marketing offer database. For example, the marketing server 120 may note that the player rejected marketing offers for free restaurant meals but accepted marketing offers for free money to play wagering games. The marketing server 120 may use this information to tailor future marketing offers to the player's preferences. From block 610, the flow ends.

It should be noted that the marketing offers may not be advertised (e.g., by issuing print or email advertisements, making announcements, putting up fliers, etc). Instead, the marketing server 120 may issue, based on time-based events or game-based events, marketing offers directly to players. Because such marketing offers are transient, the marketing server 120 and hence the casino 112 has the flexibility to modify the terms of the marketing offer (e.g., monetary value of the marketing offer, expiration time frame, player requirements, etc.) depending on the marketing offer redemption rate, availability of the marketing offer budget, etc.

Some embodiments include a computer-implemented method for monitoring and making marketing offers using electronic devices in a wagering game network. The method can include detecting an event in the wagering game network, wherein the event indicates a player's eligibility for a marketing offer, wherein the event originates from one of the electronic devices. The method can also include determining a monetary value of the marketing offer based on terms associated with the marketing offer, and determining, based on the monetary value, that the player's acceptance of the marketing offer would exceed a marketing budget. The method can include reducing the monetary value of the marketing offer to be within the marketing budget, and causing presentation of the marketing offer on the one of the electronic devices.

More Example Architectures

Figure 7:
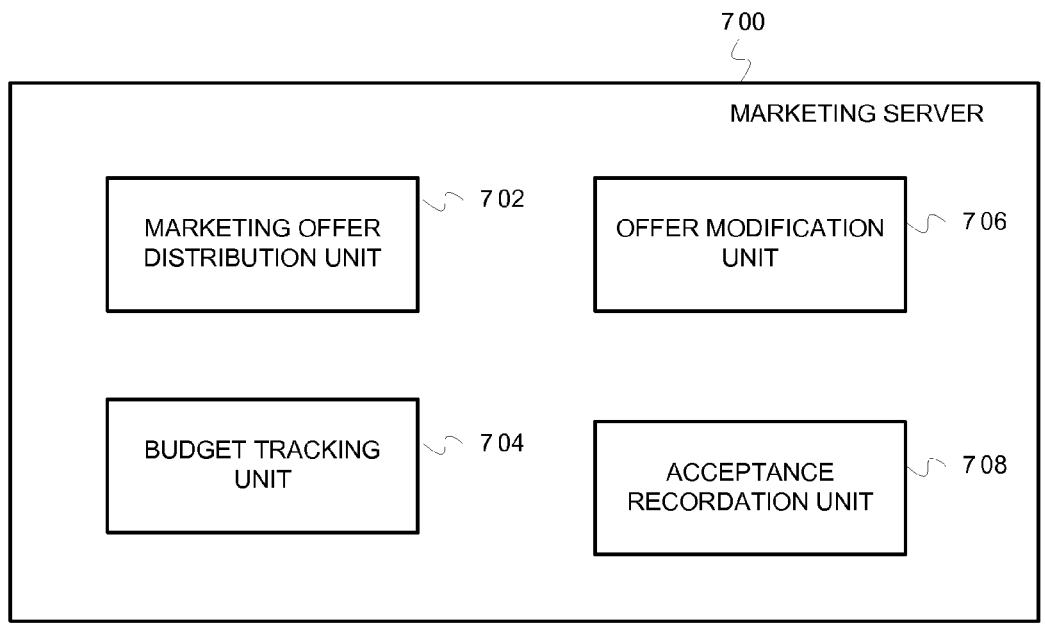
FIG. 7 is a block diagram illustrating a marketing server, according to some embodiments of the invention.

FIG. 7 is a block diagram illustrating a marketing server, according to some embodiments of the invention. As shown, a marketing server 700 includes a marketing offer distribution unit 702, budget tracking unit 704, offer modification unit 706, and acceptance recordation unit 708. As discussed above, the marketing server can manage marketing offers in a wagering game network. In some embodiments, the marketing offer distribution unit 702 can determine conditions that must be satisfied before a marketing offer will be presented to players for acceptance. For example, the unit 702 can determine when a player has wagered enough money to be eligible to receive the marketing offer. After the conditions are satisfied, the marketing distribution unit 702 can direct any suitable device in the wagering game network (e.g., wagering game machine) to present the marketing offer. In turn, the marketing offer unit 702 can how many times the marketing offer was accepted.

The marketing server 700 also includes a budget tracking unit 704 that can determine a current cost of the marketing offer based on the how many players have accepted the offer. For example, if ten players have accepted an offer for $10 off a buffet lunch, the current cost is $100. The budget tracking unit can increment the current cost each time a player accepts the marketing offer.

The marketing server 700 also includes an offer modification unit 706 to modify the offer's conditions and monetary value based on the current cost. For example, as an offer's current cost approaches the offer's budget, the offer modification unit 706 can make the conditions more difficult to meet (e.g., require players wager more money to be eligible to receive the offer). The offer modification unit 706 can also modify the monetary value of the marketing offer (e.g., reduce an offer from $10 off a lunch buffet to $5 off the lunch buffet).

The marketing server's acceptance recordation unit 708 can direct an account server (not shown in FIG. 7) to store, in player accounts, information indicating that players have accepted the marketing offer.

In some embodiments, the marketing offer can be an electronic coupon redeemable using other devices in the wagering game network, such as point of sale systems located about a casino.

Figure 8:
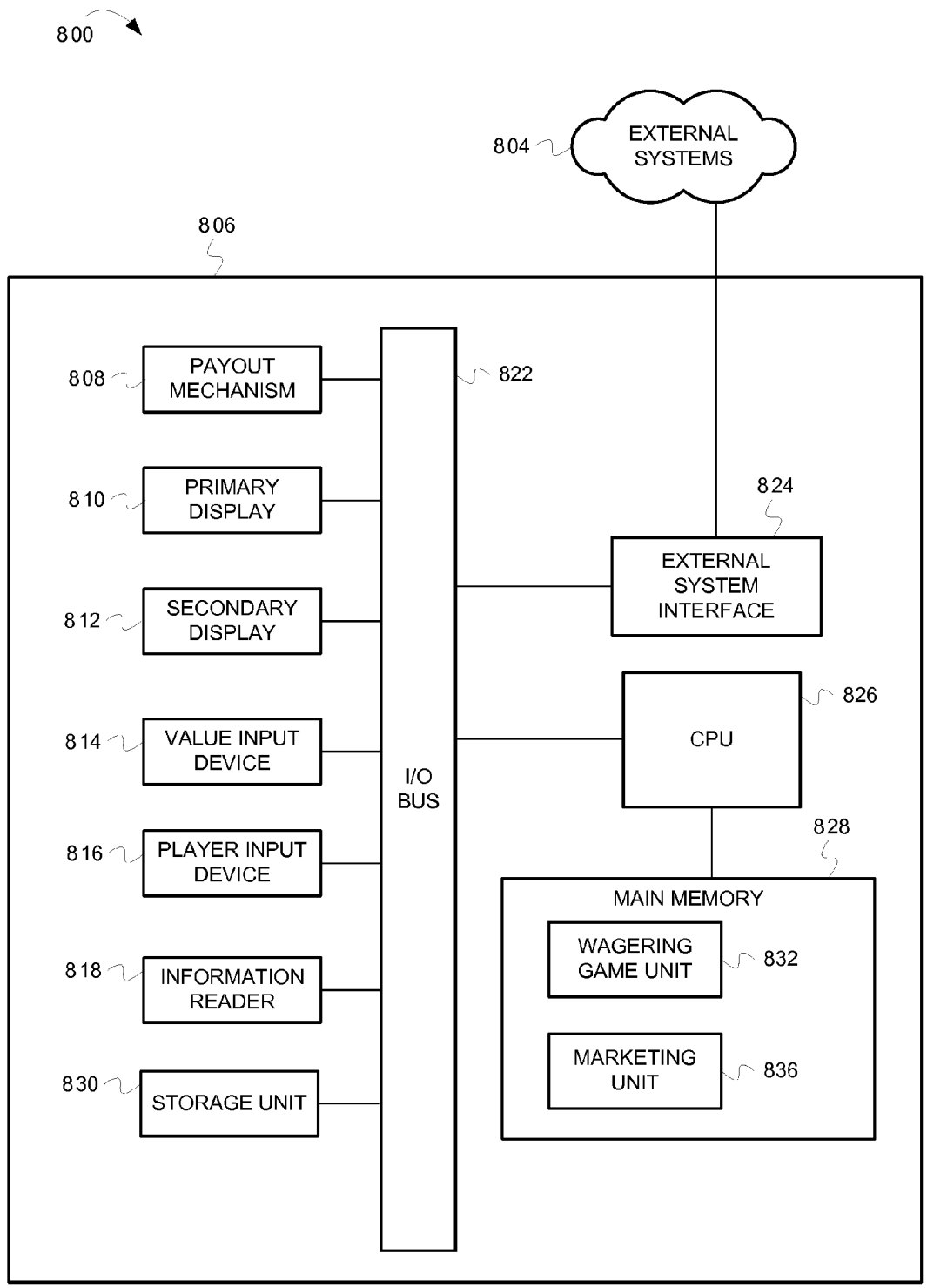
FIG. 8 is a block diagram illustrating wagering game machine architecture, according to example embodiments of the invention

FIG. 8 is a block diagram illustrating wagering game machine architecture, according to example embodiments of the invention. As shown in FIG. 8, the wagering game machine architecture 800 includes a wagering game machine 806, which includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832 and a marketing unit 836. In one embodiment, the wagering game unit 832 can present wagering games, such as video poker, video blackjack, video slots, video lottery, etc., in whole or part.

The marketing unit 836 implements functionality to receive marketing offers from a marketing server (e.g., the marketing server 120 of FIG. 1) and/or a wagering game server (e.g., the wagering game server 106 of FIG. 1). The marketing unit 836 also directs a primary display 810 and/or a secondary display 812 to present the marketing offers to the player. The marketing unit 836 receives the player's response to the marketing offer and transmits information indicating whether the player accepts or rejects the marketing offer to the marketing server 120.

The CPU 826 is also connected to an input/output (I/O) bus 822, which can include any suitable bus technologies, such as an AGTL+ frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game machine 806 can include additional peripheral devices and/or more than one of each component shown in FIG. 8. For example, in one embodiment, the wagering game machine 806 can include multiple external system interfaces 824 and/or multiple CPUs 826. In one embodiment, any of the components can be integrated or subdivided.

Any component of the architecture 800 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Example Wagering Game Machines

Figure 9:
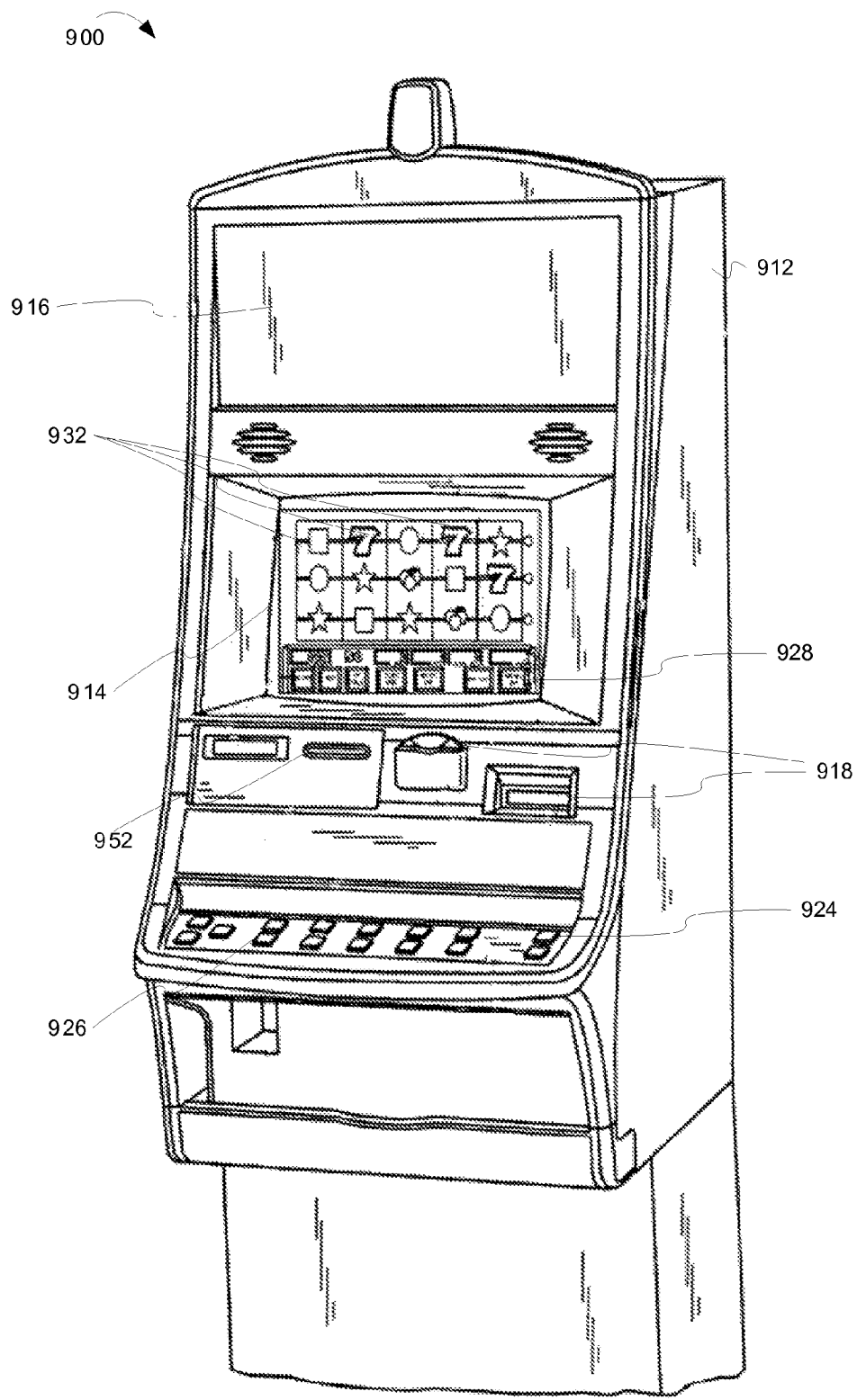
FIG. 9 is a perspective view of a wagering game machine, according to example embodiments of the invention.

FIG. 9 is a perspective view of a wagering game machine, according to example embodiments of the invention. Referring to FIG. 9, a wagering game machine 900 is used in gaming establishments, such as casinos. According to embodiments, the wagering game machine 900 can be any type of wagering game machine and can have varying structures and methods of operation. For example, the wagering game machine 900 can be an electromechanical wagering game machine configured to play mechanical slots, or it can be an electronic wagering game machine configured to play video casino games, such as blackjack, slots, keno, poker, blackjack, roulette, etc.

The wagering game machine 900 comprises a housing 912 and includes input devices, including value input devices 918 and a player input device 924. For output, the wagering game machine 900 includes a primary display 914 for displaying information about a basic wagering game. The primary display 914 can also display information about a bonus wagering game and a progressive wagering game. The wagering game machine 900 also includes a secondary display 916 for displaying wagering game events, wagering game outcomes, and/or signage information. While some components of the wagering game machine 900 are described herein, numerous other elements can exist and can be used in any number or combination to create varying forms of the wagering game machine 900.

The value input devices 918 can take any suitable form and can be located on the front of the housing 912. The value input devices 918 can receive currency and/or credits inserted by a player. The value input devices 918 can include coin acceptors for receiving coin currency and bill acceptors for receiving paper currency. Furthermore, the value input devices 918 can include ticket readers or barcode scanners for reading information stored on vouchers, cards, or other tangible portable storage devices. The vouchers or cards can authorize access to central accounts, which can transfer money to the wagering game machine 900.

The player input device 924 comprises a plurality of push buttons on a button panel 926 for operating the wagering game machine 900. In addition, or alternatively, the player input device 924 can comprise a touch screen 928 mounted over the primary display 914 and/or secondary display 916.

The various components of the wagering game machine 900 can be connected directly to, or contained within, the housing 912. Alternatively, some of the wagering game machine's components can be located outside of the housing 912, while being communicatively coupled with the wagering game machine 900 using any suitable wired or wireless communication technology.

The operation of the basic wagering game can be displayed to the player on the primary display 914. The primary display 914 can also display a bonus game associated with the basic wagering game. The primary display 914 can include a cathode ray tube (CRT), a high resolution liquid crystal display (LCD), a plasma display, light emitting diodes (LEDs), or any other type of display suitable for use in the wagering game machine 900. Alternatively, the primary display 914 can include a number of mechanical reels to display the outcome. In FIG. 9, the wagering game machine 900 is an "upright" version in which the primary display 914 is oriented vertically relative to the player. Alternatively, the wagering game machine can be a "slant-top" version in which the primary display 914 is slanted at about a thirty-degree angle toward the player of the wagering game machine 900. In yet another embodiment, the wagering game machine 900 can exhibit any suitable form factor, such as a freestanding model, bartop model, mobile handheld model, or workstation console model.

A player begins playing a basic wagering game by making a wager via the value input device 918. The player can initiate play by using the player input device's buttons or touch screen 928. The basic game can include arranging a plurality of symbols along a payline 932, which indicates one or more outcomes of the basic game. Such outcomes can be randomly selected in response to player input. At least one of the outcomes, which can include any variation or combination of symbols, can trigger a bonus game.

In some embodiments, the wagering game machine 900 can also include an information reader 952, which can include a card reader, ticket reader, bar code scanner, RFID transceiver, or computer readable storage medium interface. In some embodiments, the information reader 952 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computer-implemented method for monitoring and making marketing offers using electronic devices in a wagering game network, the method comprising:
   detecting an event in the wagering game network, wherein the event indicates eligibility of a player for a marketing offer, wherein the event originates from one of the electronic devices;
   determining a monetary value of the marketing offer based on terms associated with the marketing offer;
   determining, based on the monetary value, that acceptance by the player of the marketing offer would exceed a marketing budget; and
   reducing the monetary value of the marketing offer to be within the marketing budget; and
   causing presentation of the marketing offer on the one of the electronic devices.

2. The method of claim 1, wherein the event is generated based on one or more of an intermediate result of a wagering game, final result of a wagering game, a sum of wagers for a wagering game over a time period, and play duration of a wagering game.

3. The method of claim 1, wherein the terms comprise one or more of a listing of conditions that must be satisfied to be eligible the marketing offer, the monetary value, and an expiration time.

4. The method of claim 1 further comprising:
   detecting the player's acceptance of the marketing offer;
   storing, in association with an electronic financial account associated with the player, information indicating the player's acceptance of the marketing offer;
   discounting, at a point of sale, a purchase transaction associated with the marketing offer by an amount equal to the monetary value of the marketing offer.

5. The method of claim 1, wherein the marketing budget is a percentage of a casino's revenue over a time period, and wherein the method further comprises:
   determining, based data collected by the electronic devices in the wagering game network, the casino's revenue over the time period; and
   determining the marketing budget based on the casino's revenue over the time period.

6. A system to monitor and make marketing offers in a wagering game network, the system comprising:
   means for detecting an event in the wagering game network, wherein the event indicates a player's eligibility for a marketing offer, wherein the event originates from an electronic device on the wagering game network;
   means for determining a monetary value of the marketing offer based on terms associated with the marketing offer;
   means for determining, based on the monetary value, that the player's acceptance of the marketing offer would exceed a marketing budget; and
   means for reducing the monetary value of the marketing offer to be within the marketing budget; and
   means for causing presentation of the marketing offer on the one of the electronic devices.

7. The system of claim 6, wherein the event is generated based on one or more of an intermediate result of a wagering game, final result of a wagering game, a sum of wagers for a wagering game over a time period, and play duration of a wagering game.

8. The system of claim 6, wherein the terms comprise one or more of a listing of conditions that must be satisfied to be eligible the marketing offer, the monetary value, and an expiration time.

9. The system of claim 6 further comprising:
   means for detecting the player's acceptance of the marketing offer;
   means for storing, in association with an electronic financial account associated with the player, information indicating the player's acceptance of the marketing offer;
   means for discounting, at a point of sale in the wagering game network, a purchase transaction associated with the marketing offer by an amount equal to the monetary value of the marketing offer.

10. The system of claim 6, wherein the marketing budget is a percentage of a casino's revenue over a time period, and wherein the system further comprises:
    means for determining, based data collected by the electronic devices in the wagering game network, the casino's revenue over the time period; and
    means for determining the marketing budget based on the casino's revenue over the time period.

11. An apparatus comprising:
    at least one processor;
    one or more machine-readable storage devices configured to store instructions which when executed by the at least one processor, cause the at least one processor to perform operations for monitoring and making marketing offers using electronic devices in a wagering game network, the instructions including,
       instructions to detect an event in the wagering game network, wherein the event indicates eligibility of a player for a marketing offer, wherein the event originates from one of the electronic devices;
       instructions to determine a monetary value of the marketing offer based on terms associated with the marketing offer;
       instructions to determine, based on the monetary value, that acceptance by the player of the marketing offer would exceed a marketing budget; and
       instructions to reduce the monetary value of the marketing offer to be within the marketing budget; and
       instructions to cause presentation of the marketing offer on the one of the electronic devices.

12. The apparatus of claim 11, wherein the event is generated based on one or more of an intermediate result of a wagering game, final result of a wagering game, a sum of wagers for a wagering game over a time period, and play duration of a wagering game.

13. The method of claim 11, wherein the terms comprise one or more of a listing of conditions that must be satisfied to be eligible the marketing offer, the monetary value, and an expiration time.

14. The apparatus of claim 11, wherein the instructions further comprise:
    instructions to detect the player's acceptance of the marketing offer;
    instructions to store, in association with an electronic financial account associated with the player, information indicating the player's acceptance of the marketing offer;
    instructions to discount, at a point of sale, a purchase transaction associated with the marketing offer by an amount equal to the monetary value of the marketing offer.

15. The apparatus of claim 11, wherein the marketing budget is a percentage of a casino's revenue over a time period, and wherein the instructions further comprise:
    instructions to determine, based data collected by the electronic devices in the wagering game network, the casino's revenue over the time period; and
    instructions to determine the marketing budget based on the casino's revenue over the time period.

16. A non-transitory machine-readable storage device including instructions which when executed by one or more processors cause the one or more processors to perform operations for monitoring and making marketing offers using electronic devices in a wagering game network, the instructions comprising:
    instructions to detect an event in the wagering game network, wherein the event indicates eligibility of a player for a marketing offer, wherein the event originates from one of the electronic devices;
    instructions to determine a monetary value of the marketing offer based on terms associated with the marketing offer;
    instructions to determine, based on the monetary value, that acceptance by the player of the marketing offer would exceed a marketing budget; and
    instructions to reduce the monetary value of the marketing offer to be within the marketing budget; and
    instructions to cause presentation of the marketing offer on the one of the electronic devices.

17. The non-transitory machine-readable storage device of claim 16, wherein the event is generated based on one or more of an intermediate result of a wagering game, final result of a wagering game, a sum of wagers for a wagering game over a time period, and play duration of a wagering game.

18. The non-transitory machine-readable storage device of claim 16, wherein the terms comprise one or more of a listing of conditions that must be satisfied to be eligible the marketing offer, the monetary value, and an expiration time.

19. The non-transitory machine-readable storage device of claim 16, the instructions further comprising:
- instructions to detect the player's acceptance of the marketing offer;
- instructions to store, in association with an electronic financial account associated with the player, information indicating the player's acceptance of the marketing offer;
- instructions to discount, at a point of sale, a purchase transaction associated with the marketing offer by an amount equal to the monetary value of the marketing offer.

20. The non-transitory machine-readable storage device of claim 16, wherein the marketing budget is a percentage of a casino's revenue over a time period, and wherein the instructions further comprise:
- instructions to determine, based data collected by the electronic devices in the wagering game network, the casino's revenue over the time period; and
- instructions to determine the marketing budget based on the casino's revenue over the time period.

* * * * *